United States Patent
Wang (10) Patent No.: US 7,336,845 B2
(45) Date of Patent: Feb. 26, 2008

(54) IMPROVING MODULATION TRANSFER FUNCTION OF AN IMAGE

(75) Inventor: Kuo-Jeng Wang, Kaohsiung (TW)

(73) Assignee: Transpacific IP Ltd., Taipei (TW)

( * ) Notice: Subject to any disclaimer, the term of this patent is extended or adjusted under 35 U.S.C. 154(b) by 733 days.

(21) Appl. No.: 10/419,116

(22) Filed: Apr. 21, 2003

(65) Prior Publication Data

US 2004/0208386 A1 Oct. 21, 2004

(51) Int. Cl.
*G06K 9/40* (2006.01)
*H04N 1/407* (2006.01)

(52) U.S. Cl. ..................... 382/254; 358/3.27
(58) Field of Classification Search ............... 382/162, 382/167, 254, 263, 266, 275; 358/3.27, 518, 358/521, 530
See application file for complete search history.

(56) References Cited

U.S. PATENT DOCUMENTS

| 5,357,353 | A | * | 10/1994 | Hirota | ........................ 358/530 |
| 5,398,124 | A | * | 3/1995 | Hirota | ........................ 358/530 |
| 6,028,957 | A | * | 2/2000 | Katori et al. | ............... 382/162 |

* cited by examiner

*Primary Examiner*—Kanjibhai Patel
(74) *Attorney, Agent, or Firm*—Stolowitz Ford Cowger LLP (57) ABSTRACT

The border of object in an image is blurred and so the modulation transfer function (MTF) of an image is reduced due to the blurred border. This present invention provides a deductive method for determining a border of an object in an image. Then the border of the object therein is amended and so the MTF of image is increased. In regard to an increasingly changeable color image, the present invention provides a deductive method in deciding upon a gray scale of the image to increase the color accuracy in amending an image.

41 Claims, 5 Drawing Sheets

IMPROVING MODULATION TRANSFER FUNCTION OF AN IMAGE

BACKGROUND OF THE INVENTION

1. Field of the Invention

This invention generally relates to a method for image processing, and more particularly improvement in the modulation transfer function of an image.

2. Description of the Prior Art

Recently, apparatuses for capturing an image are popular and quite a few exist, e.g. a scanner, a digital camera, etc. A light sensing device captures light through optical lenses, which an object radiates or reflects from another light source, and obtains a formation of image of the object. A CCD (charge-coupled device, CCD) device or a CMOS (complementary metal-oxide-semiconductor) device is a common light sensing device that can capture the light to transfer an image digital data.

The image data can not be completed equal to that which is seen with the human eye, due to physical limitations or defects of the apparatus. For example, the modulation transfer function of the captured image reduces the result from an insufficient contrast, a blurred formation of images and so forth. The limitations are diffraction, aberrations, chromatism, and the scattering from an external light source and so on. Some limitations can be solved by means of amending the design of the apparatus. For example: amending the curvature of the lenses or the optic axis to solve the aberration; changing the material or the combination of lenses to solve the chromatism; employing rough inner surfaces on the apparatus and spreading black material on the inner surfaces thereof to reduce the scattering of external light. Although, this handling improves the quality of the captured image, but it can not totally overcome the effects and limitations thereof. The captured image still debases a definition and a contrast with the effects.

The original data (equal to that which is seen with the human eye) of the image is not destroyed but hidden by the effects, e.g. a difference in the brightness between pixels in a border between an object and the background of the image. The ratio in brightness relatively becomes smaller and not so obvious, due to joining the effect into the original data. Hence, the captured image is blurred. The image data comprises the original data and the unneeded external data.

The advantage of the digital image is that the digital image can function with a logical operation and a logical analysis. Hence, the digital image can be processed with software for enhancing the contrast or increasing the brightness thereof. Nevertheless, the image with enhanced contrast increases the difference in brightness and aliasing, which then becomes non-distinct due to processing the contrast thereof.

To eliminate external data is hard. The characteristics of external data do not affect the difference between pixels in the original data of the image. Furthermore, the digital image can function with a logical operation to amend the image data. Therefore, the border between an object and the background of the image can be determined with the characteristic and then the border therebetween is processed for amending the border. Moreover, the amending process is only processed with the border therebetween and not with the object and the background in the image. Hence, the amending process does not change the data of the image expect the border and does not cause a problem with aliasing. In the conventional art, the border is determined with 9 pixels, but in the present invention, the border can be determined with less pixels and the efficiency of the operation is improved.

SUMMARY OF THE INVENTION

In the conventional art, the captured image is not identical with the original image in sharpness or definition. Furthermore, the captured image is amended with processing image software, which has the aliasing problem. One of objectives of the present invention is to provide a method for improving the modulation transfer function of an image.

Another objective of present invention is to employ a method for amending the border of an object in the image without changing the border in the image. Therefore, the amended image does not bring about the problem of aliasing.

Another objective of present invention is to amend the border of an object for reducing the width of the blurred border.

Another objective of the present invention is to improve the quality of the image with less data and increase the efficiency of the processing image for economizing on time.

p As aforementioned, the present invention provides a method for improving the modulation transfer function of an image. The present invention employs a varying brightness characteristic on the border of an object in an image to determine the border and to amend the border of the image in order to increase the modulation transfer function (MTF) of the image. The width (i.e. the amount of pixels) in the border becomes narrow and so the image becomes distinct. The data of the object does not change due to amending the border of the object in the image. Therefore, the image does not increase the aliasing after amended. Moreover, the method needs less data to amend the MTF of the image and increases the processing efficiency for economizing on time.

DESCRIPTION OF THE PREFERRED EMBODIMENT

Some sample embodiments of the invention will now be described in greater detail. Nevertheless, it should be recognized that the present invention can be practiced in a wide range of other embodiments besides those explicitly described, and the scope of the present invention is expressly not limited expect as specified in the accompanying claims.

The data of an image comprises respective color values of the primary colors of red, green, and blue. The displaying color of the image mixes the respective colors thereof. Hence, the method of improving the MTF of the image employs the respective color values of three primary colors (RGB) to determine a border of an object in the image.

In one preferred embodiment, X(i,j) means a color value of one of red, green and blue, and "(i,j)" of X(i,j) means a coordinate (i,j). The "i" (i,j) means the coordinate value in the vertical axis, and the "j" means the coordinate value in the horizontal axis.

Figure 1A:
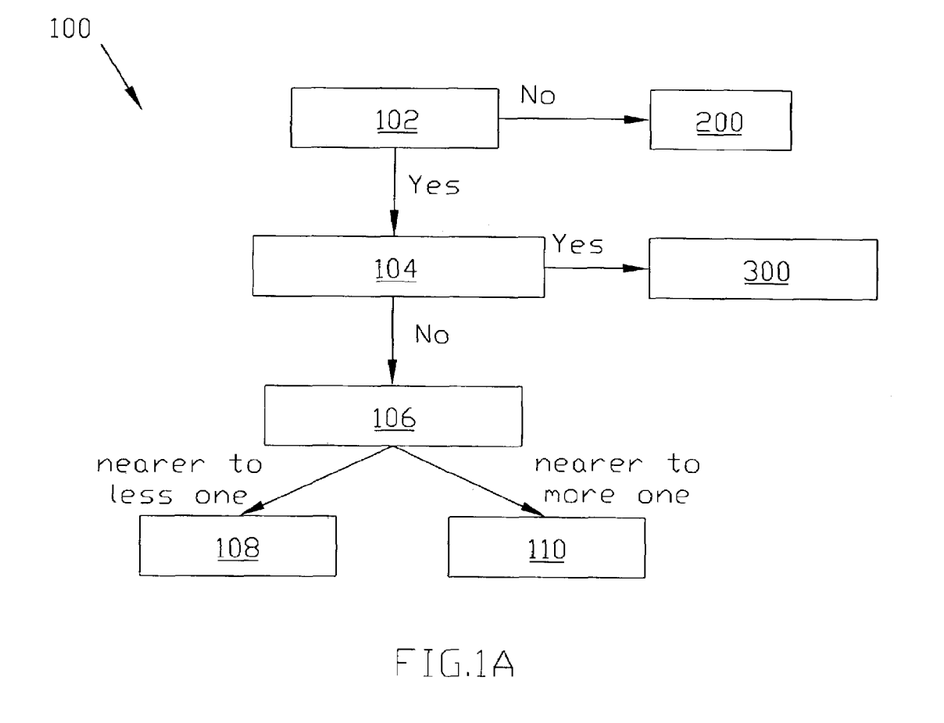
FIG. 1A is a flow chart of amending vertical border.

Referring to FIG. 1A, shows a flow chart of amending vertical border 100 in the preferred embodiment. First, determining vertical border 102 determines with the color values X(i−1,j), X(i,j) and X(i+1,j) of three successive pixels at same color in a vertical axis. If it is a vertical border, the color value gradually reduces or increases, i.e. the brightness of the color gradually reduces or increases. Therefore, the vertical border satisfies the condition of X(i−1,j)<X(i,j)<X(i+1,j) or X(i−1,j)>X(i,j)>X(i+1,j). The function of determining vertical border 102 can be written as:

$$[X(i+1,j)-X(i,j)][X(i,j)-X(i-1,j)]>0 \quad (1)$$

If Eq. (1) is false, amending horizontal border 200 proceeds. If Eq. (1) is true, the horizontal vertical border 104 determination proceeds. The function of determining horizontal vertical border 104 can be written as:

$$[X(i,j+1)-X(i,j)][X(i,j)-X(i,j-1)]>0 \quad (2)$$

If Eq. (2) is true, amending the horizontal vertical border 300 proceeds. If Eq. (2) is false, value deflection 106 determination proceeds. Determining value deflection 106 determines whether the pixel color value of X(i,j) is nearer to the color value of X(i+1,j) or X(i−1,j). The function of determining the value deflection 106 can be written as:

$$abs[X(i+1,j)-X(i,j)]>abs[X(i-1,j)-X(i,j)] \quad (3)$$

Figure 1B:
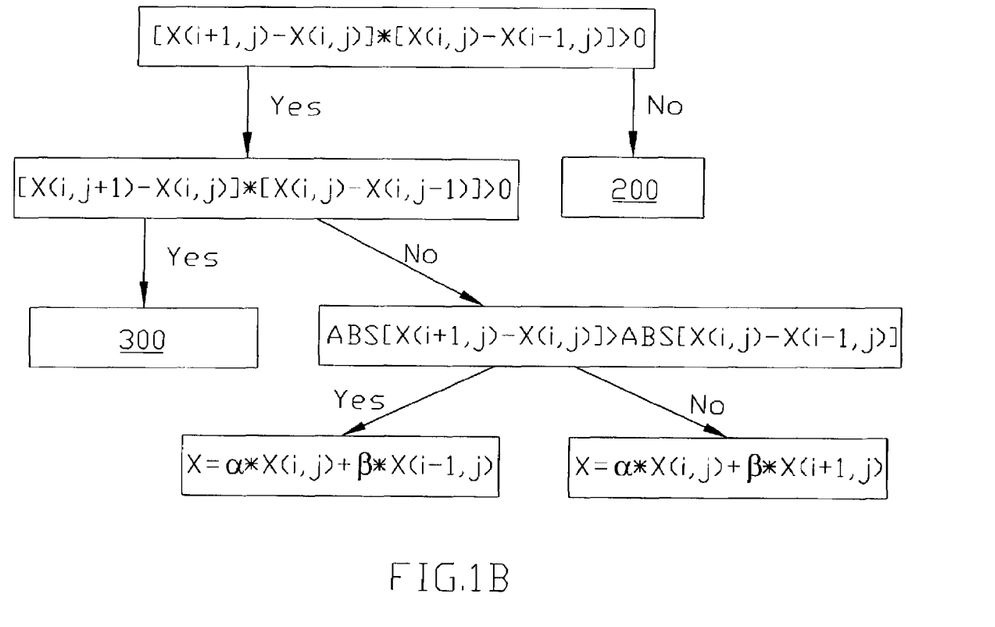
FIG. 1B is a flow chart of amending vertical border with functions.

If Eq. (3) is true, it means the pixel color value of X(i,j) is nearer to X(i−1,j), and the pixel value of X(i,j) is replaced with the average of X(i,j) and X(i−1,j). If Eq. (3) is false, it means the pixel color value of X(i,j) is nearer to X(i+1,j), the pixel value of X(i,j) replaces with the average of X(i,j) and X(i+1,j). When the pixel color value of X(i,j) is nearer to X(i−1,j), the effect in X(i,j) of X(i−1,j) is bigger than of X(i+1,j), i.e. X(i,j) and X(i−1,j) belong to a same bright area or dark area but X(i,j) slightly shifts to X(i+1,j) due to the effect of X(i+1,j). Therefore, X(i,j) must be amended to X(i−1,j). Similarly, when the pixel color value of X(i,j) is nearer to X(i+1,j), X(i,j) must be amended to X(i+1,j). In short, X(i,j) is nearer to a minimum of X(i−1,j) and X(i+1,j), X(i,j) is amended to be nearer the minimum 108; X(i,j) is nearer to a maximum of X(i−1,j) and X(i+1,j), X(i,j) is amended to be nearer the maximum 110. Hence, X(i,j) in blurred bright area is amended to become brighter, or X(i,j) in blurred dark area is amended to become darker to increasing the sharpness of the border in the image. The flow chart for amending the vertical border with functions is as shown in FIG. 1B.

Figure 2A:
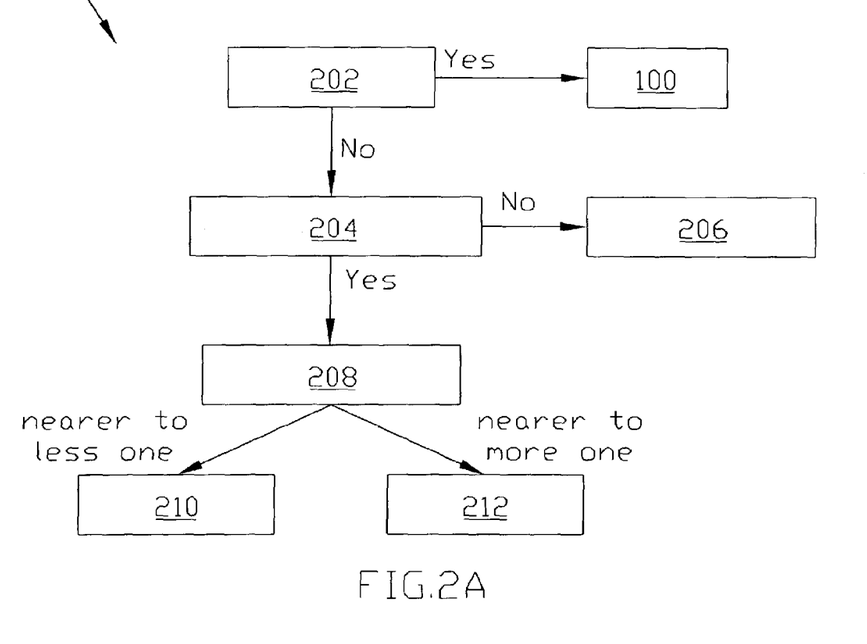
FIG. 2A is a flow chart of amending horizontal border.

Referring to FIG. 2A, it is a flow chart for amending the horizontal border 200 in another preferred embodiment of this invention. First, determining the horizontal border 202 is done by using Eq. (1). If it is true, amending the vertical border 100 proceeds. If it is false, determining horizontal 204 proceeds to determine the horizontal border with the color values X(i,j−1), X(i,j) and X(i,j+1) of three successive pixels with the same color in a horizontal axial. If it is a horizontal border, the color value is gradually reduced or increased, i.e. the brightness of the color gradually reduces or increases. Therefore, the horizontal border satisfies the condition of X(i,j−1)<X(i,j)<X(i,j+1) or X(i,j−1)>X(i,j)>X(i,j+1). The horizontal border is determined by Eq. (2).

If Eq. (2) is false, not amending 206 is proceeds-due to the pixel (i,j) not a horizontal border or a vertical border. If it is true, determining value deflection 208 proceeds to determine the pixel color value of X(i,j) which is nearer to the pixel color value of X(i,j+1) or X(i,j−1). The function of determining value deflection 208 can be written as:

$$abs[X(i,j+1)-X(i,j)]>abs[X(i,j)-X(i,j-1)] \quad (4)$$

Figure 2B:
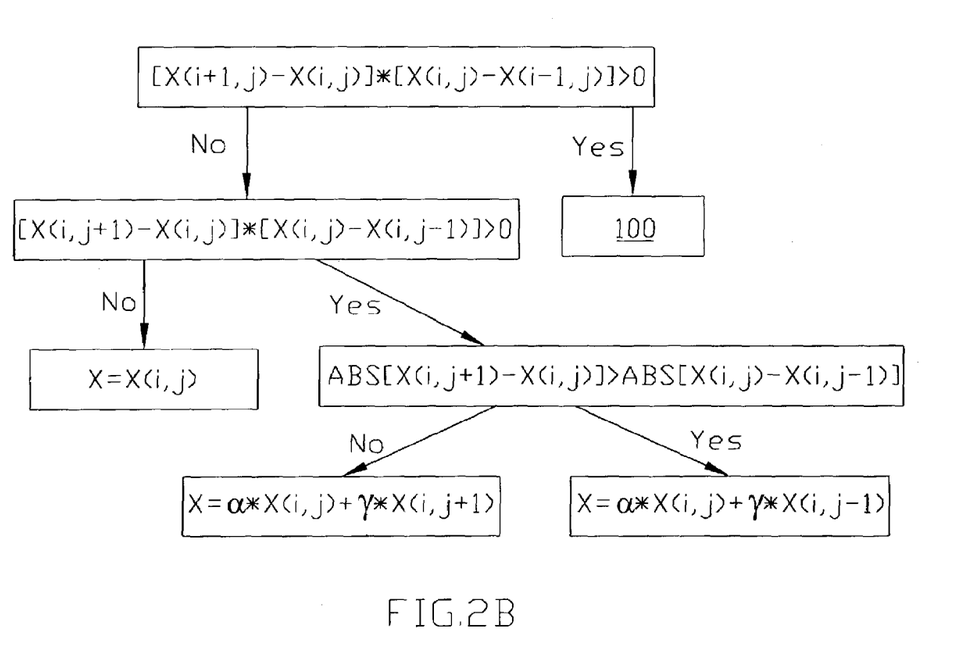
FIG. 2B is a flow chart of amending horizontal border with functions.

If Eq. (4) is true, it means the pixel color value of X(i,j) is nearer to X(i,j−1), the pixel value of X(i,j) replaces the average of X(i,j) and X(i,j−1). If it is false, it means the pixel color value of X(i,j) is nearer to X(i,j+1), the pixel value of X(i,j) replaces the average of X(i,j) and X(i,j+1). When the pixel color value of X(i,j) is nearer to X(i,j−1), the effect in X(i,j) or X(i,j−1) is bigger than of X(i,j+1), i.e. X(i,j) and X(i,j−1) belongs to the same bright area or dark area but X(i,j) slightly shifts to X(i,j+1) due to the effect of X(i,j+1). Therefore, X(i,j) is amended to X(i,j−1). Similarly, when the pixel color value of X(i,j) is nearer to X(i,j+1), X(i,j) is amended to X(i,j+1). In short, X(i,j) is nearer to a minimum of X(i,j−1) and X(i,j+1), X(i,j) is amended to be nearer the minimum 210; X(i,j) is nearer to a maximum of X(i,j−1) and X(i,j+1), X(i,j) is amended to be nearer the maximum 212. Hence, X(i,j) in blurred bright area is amended to become brighter, or X(i,j) in blurred dark area is amended to become dark to increase the sharpness of the border in the image. The flow chart for amending the horizontal border with functions is as shown in FIG. 2B.

Figure 3A:
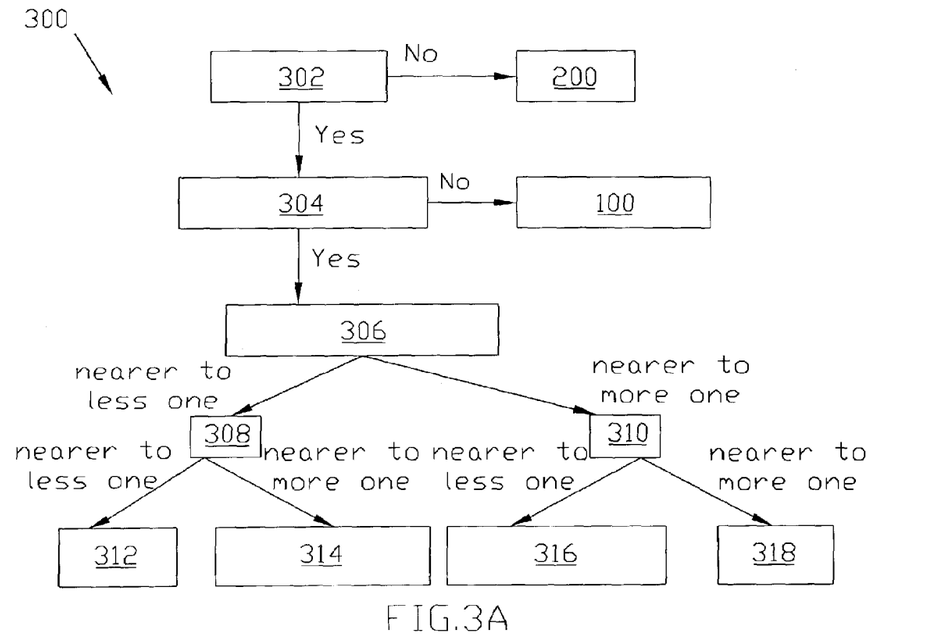
FIG. 3A is a flow chart of amending horizontal vertical border.

Referring to FIG. 3A, it is a flow chart of amending horizontal vertical border 300 in a still another preferred embodiment of this invention. First, determining the vertical border 302 with Eq. (1). If it is false, amending the vertical border 200 proceeds. If it is true, determining the horizontal vertical 304 proceeds with Eq. (2). If Eq. (2) is true, determining the horizontal value deflection 306 proceeds, i.e. X(i,j) is determined nearer to the pixel color value of X(i+1,j) or X(i−1,j) with Eq. (3) in a horizontal direction.

If Eq. (3) is true, it means the pixel color value of X(i,j) is nearer to X(i−1,j) in the horizontal direction. Furthermore, determining the vertical value deflection 308 determines X(i,j) nearer to the pixel color value of X(i,j+1) or X(i,j−1) with Eq. (4) in a vertical direction. If Eq. (4) is true, it means that the pixel color value of X(i,j) is nearer to X(i−1,j) in the horizontal direction and X(i,j−1) in the vertical direction. Therefore, the X(i,j) replaces the average of X(i,j), X(i−1,j) and X(i,j−1). If Eq. (4) is false, it means that the pixel color value of X(i,j) is nearer to X(i−1,j) in the horizontal direction and X(i,j+1) in the vertical direction. Therefore, the X(i,j) is replaced with the average of X(i,j), X(i−1,j) and X(i,j+1).

If Eq. (3) is false, it means the pixel color value of X(i,j) is nearer to X(i+1,j) in the horizontal direction. Furthermore, determining vertical deflection 310 determines X(i,j) nearer to the pixel color value of X(i,j+1) or X(i,j−1) with Eq. (4) in a vertical direction. If Eq. (4) is true, it means that the pixel color value of X(i,j) is nearer to X(i+1,j) in the horizontal direction and X(i,j−1) in the vertical direction. Therefore, the X(i,j) is replaced with the average of X(i,j), X(i+1,j) and X(i,j−1). If Eq. (4) is false, it means that the pixel color value of X(i,j) is nearer to X(i+1,j) in the horizontal direction and X(i,j+1) in the vertical direction. Therefore, the X(i,j) is replaced with the average of X(i,j), X(i+1,j) and X(i,j+1).

Figure 3B:
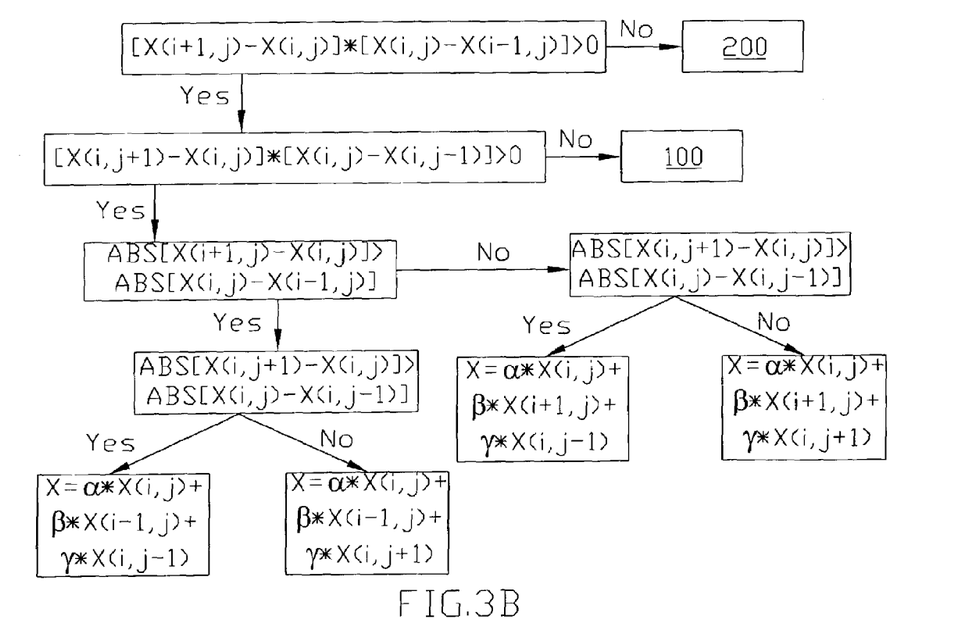
FIG. 3B is a flow chart of amending horizontal vertical border with functions.

Referring to FIG. 3B, X(i,j) is nearer to a minimum of X(i−1,j) and X(i+1,j) in the horizontal direction and a minimum of X(i,j−1) and X(i,j+1) in the vertical direction, X(i,j) is amended to be nearer to the minimum 312 in the horizontal direction and in the vertical direction. X(i,j) is nearer to a minimum of X(i−1,j) and X(i+1,j) in the horizontal direction and a maximum of X(i,j−1) and X(i,j+1), X(i,j) is amended to be nearer to the minimum in horizontal direction and the maximum in the vertical direction 314. X(i,j) is nearer to a maximum of X(i−1,j) and X(i+1,j) in the horizontal direction and a maximum of X(i,j−1) and X(i,j+1) in the vertical direction, X(i,j) is amended to be nearer to the maximum in the horizontal direction and in the vertical direction 318. X(i,j) is nearer to a maximum of X(i−1,j) and X(i+1,j) in the horizontal direction and a minimum of X(i,j−1) and X(i,j+1), X(i,j) is amended to be nearer to the maximum in horizontal direction and the minimum in the vertical direction 316.

Figure 4A:
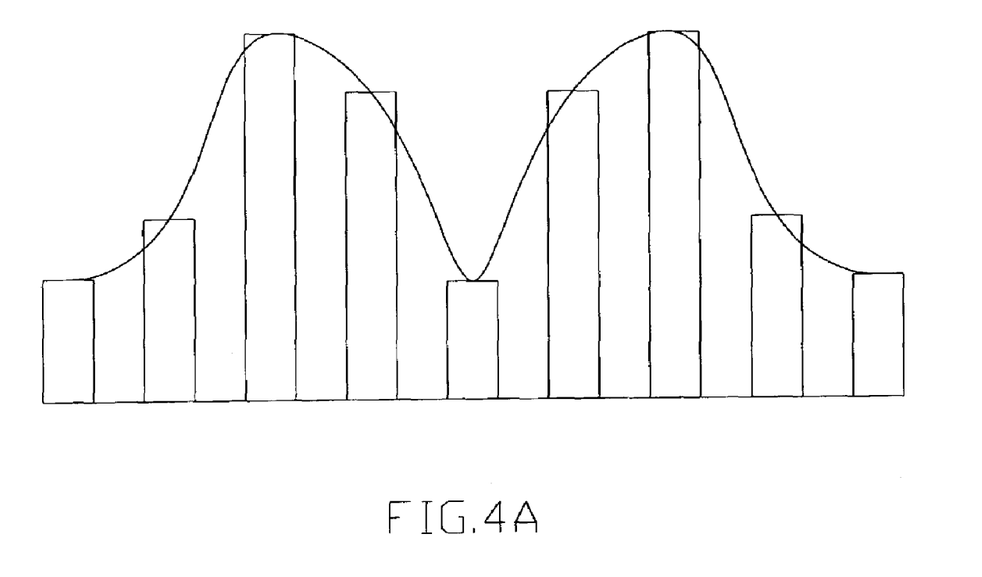
FIGS. 4A to 4D is a diagram before amended and after amended, respectively.
Figure 4B:
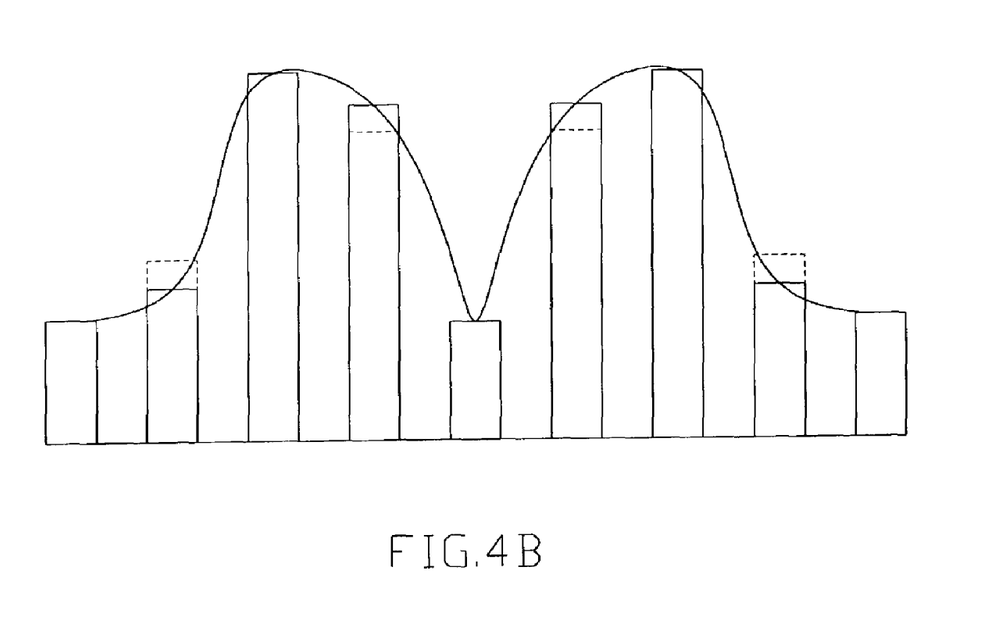

Any pixel in an image can be determined in a horizontal border, a vertical border, a horizontal vertical border, or not with aforementioned preferred embodiments. The dark pixel in the border is amended to be darker and brighter pixels in the border are amended to be brighter to increase the sharpness of the border and the MTF of the image. FIGS. 4A to 4B is diagram before being amended and after being amended, respectively.

Moreover, specific weights of X(k,j) and X(i,m) are adjustable. X(i,j) is replaced with $$\alpha \times X(i,j) + \beta \times X(k,j) + \gamma \times X(i,m) \quad (5)$$

Wherein, X(k,j) is the adjacent pixel of X(i,j) in the horizontal direction with the nearer value of the same color; X(i,m) is the adjacent pixel of X(i,j) in the vertical direction with the nearer value of the same color. The $\alpha$, $\beta$, and $\gamma$ are of a specific weight respectively, between 0 and 1, and $\alpha + \beta + \gamma = 1$.

If X(i,j) is only amended in the horizontal border, $\beta = 0$. If (X(i,j) is only amended in the verital border, $\gamma = 0$. A preferred amendment is obtained by a different specific weight according to different states.

Figure 4C:
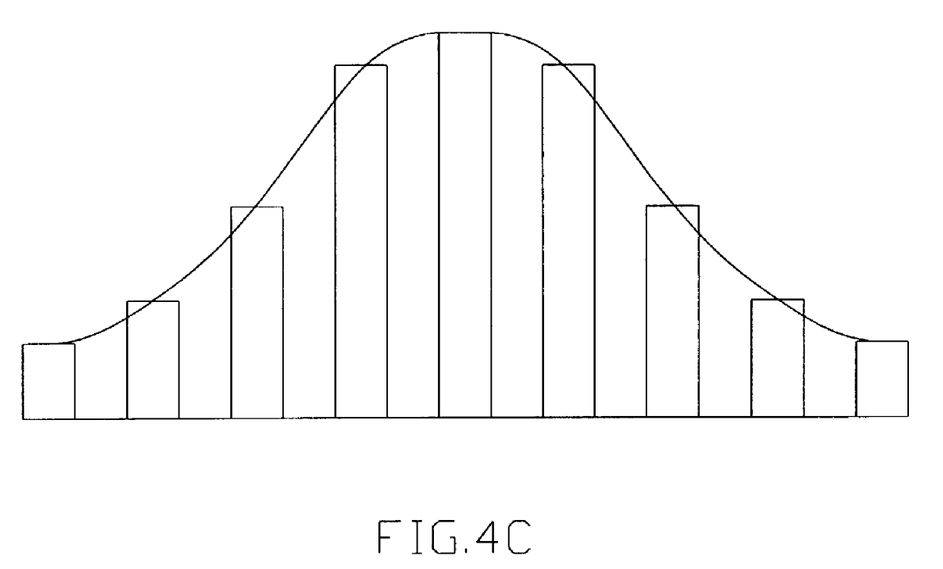
Figure 4D:
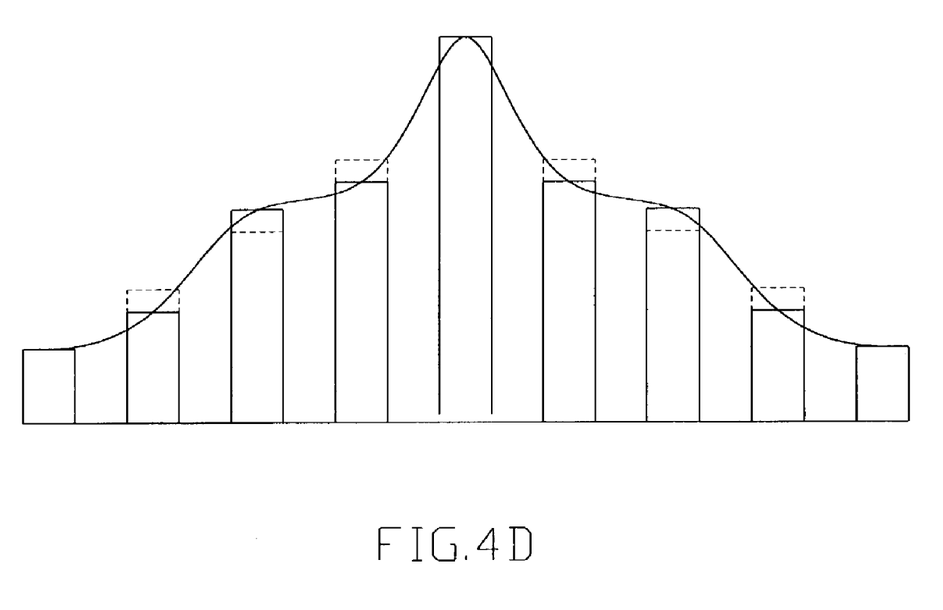

The method for improving MTF of an image in this invention can be employed in the width that exceeds three pixels in the horizontal or vertical direction. For example, the successive five pixels of X(i−2,j), X(i−1,j), X(i,j), X(i+1,j) and X(i+2,j) are in a border of an object in an image, i.e. the color value gradually increases or decreases. The amended color value of X(i,j) is the average of the non-amended X(i,j) and the nearer color value of the non-amended adjacent pixel. Hence, the amended image is easier to differentiate between an object and a background and the MTF of the amended image increases. Furthermore, the width of the border efficiently narrows, as shown in FIG. 4C and FIG. 4D.

In regard to an increasingly chagneable color image, a pixel in a non-border area may be determined as a pixel in a border with only one color of red, green and blue. Hence, the gray scale portion in the image is only determined to avoid a wrong interpretation. The gray scale portion means the portion that one color value of red, green and blue differs less than $\delta$ from the other color value thereof. The function of determining gray scale can be written as:

$$\text{Max}[\text{abs}(Xr-Xg), \text{abs}(Xg-Xb), \text{abs}(Xb-Xr)] < \delta \quad (6)$$

Wherein, the Xr, Xg, and Xb are the color value of red, green, and blue, respectively. The "abs" means absolute value. the "$\delta$" means the limitation range of determining the gray scale, e.g. $\delta=21$. Hence, amending the vertical border 100, amending the horizontal border 200, and amending the horizontal vertical border 300 proceeds if the difference between one color value of red, green, and blue and the other color value thereof is less than 21 to avoid the wrong interpretation.

Although specific embodiments have been illustrated and described, it will be obvious to those skilled in the art that various modifications may be made without departing from what is intended to be limited solely by the appended claims.

What is claimed is:

1. A method comprising:
   determining whether a pixel is in a border of an object in an image;
   comparing a color value of the determined pixel to color values of two or more other selected pixels;
   determining which one of the color values of the two or more other selected pixels is nearest to the color value of the determined pixel; and
   amending the color value of the determined pixel based at least in part on the nearest color value determination to increase the modulation transfer function of the image.

2. The method according to claim 1, further comprising determining a border of an object in an image using a vertical boarder function.

3. The method according to claim 2, wherein said vertical border function comprises:

$$[X(i+1,j)-X(i,j)][X(i,j)-X(i-1,j)] > 0$$

wherein X(i−1,j), X(i,j) and X(i+1,j) comprises color values.

4. The method according to claim 2, wherein the amended color value of said determined pixel in said border comprises:

$$\alpha \times X(i,j) + \beta \times X(k,j)$$

wherein X(k,j) is one of said X(i−1,j) or said X(i+1,j); and the sum of $\alpha$ and $\beta$ is 1.

5. The method according to claim 4, wherein said $\alpha$ is 0.5 and said $\beta$ is 0.5.

6. The method according to claim 1, wherein a deductive method for determining said border comprises a horizontal deductive function.

7. The method according to claim 6, wherein said horizontal deductive function comprises;

$$[X(i,j+1)-X(i,j)][X(i,j)-X(i,j-1)] > 0$$

wherein X(i,j+1), X(i,j) and X(i,j−1) comprise color values.

8. The method according to claim 6, wherein the amended color value of said determined pixel in said border comprises;

$$\alpha \times X(i,j) + \beta \times X(i,k)$$

wherein X(i,k) is one of said X(i,j−1) or said X(i,j+1); and the sum of $\alpha$ and $\beta$ is 1.

9. The method according to claim 8, wherein said $\alpha$ is 0.5 and said $\beta$ is 0.5.

10. The method according to claim 1, wherein a deductive method for determining said border comprises a horizontal vertical deductive function.

11. The method according to claim 10, wherein said horizontal vertical deductive function comprises;

$$[X(+1,j)-X)i,j)][X(i,j)-X(i-1,j)] > 0$$

$$[X(i,j+1(-X(i,j)][X(i,j)-X(i,j-1)] > 0$$

wherein X(i−1,j), X(i,j), X(i,j−1), X(i+1,j) and X(i,j+1) comprise color values.

12. The method according to claim 10, wherein the amended color value of said determined pixel in said border comprises;

$$\alpha \times X(i,j) + \beta \times X(i,k) + \gamma \times X(m,j)$$

wherein X(m,j) is one of said X(i−1,j) or said X(i+1,j); X(i,k) is one of said X(i,j−1) or said X(i,j+1); and the sum of α, β and γ is 1.

13. The method according to claim 12, wherein said α, and β and said γ are each ⅓.

14. The method of claim 1, further comprising amending the determined pixel of the border without introducing a substantially aliasing effect.

15. The method of claim 1, further comprising reducing a width of the border.

16. The method of claim 1, further comprising varying a brightness characteristics on the border.

17. The method of claim 1, further comprising determining if the determined pixel is in a blurred bright area of the image or if the determined pixel is in a blurred dark area of the image;
   amending the color value of the determined pixel to increase brightness if in the blurred bright area of the image; and
   amending the color value of the determined pixel to increase darkness if in a blurred dark area of the image.

18. A method comprising:
   determining whether a pixel is in a portion of a gray scale in an image;
   determining whether a pixel is in a border of an object in an image;
   comparing the color value of the determined pixel to color values of two or more selected pixels;
   determining a nearest color value of the two or more selected pixels to the determined pixel's color value; and
   amending the color value of the determined pixel based at least in part on the nearest color value to decrease blurring of the image.

19. The method according to claim 18, wherein a deductive function for determining said gray scale comprises;

$Max[abs(Xr-Xg), abs(Xg-Xb), abs(Xb-Xr)] < \delta$ wherein Xr comprises is a red color value of said pixel; Xg comprises a green color value of said pixel; Xb comprises a blue color value of said pixel; δ comprises a value between about 0 and about 21.

20. The method according to claim 18, wherein a deductive function for determining whether a pixel is in a border comprises a horizontal and a vertical deductive function.

21. The method according to claim 20, wherein said horizontal deductive function and said vertical deductive function respectively comprise;

$[X(i+1,j)-X(i,j)][X(i-1,j)]>O$ $[X(i,j+1)-X(i,j)][X(i,j)-X(i,j-1)]>O$ wherein X(i−1,j), X(i,j), X(i,j−1), X(i+1,j) and X(i,j+1) comprise color values.

22. The method according to claim 20, wherein the amended color value of said determined pixel in said border comprises:

$\alpha x X(ij) + p x X(i,k) + \gamma \times X(mj)$ wherein X(m,j) is one of said X(i−1,j) or said X(i+1,j); X(i,k) is one of said X(i,j−1) or said X(i,j+1); the sum of α,β and γ is 1.

23. A scanner capable of:
   determining whether a pixel is in a border of an object in an image;
   comparing the color value of the determined pixel to color values of two or more selected pixels;
   determining which one of the color values of the two or more other selected pixels is nearest to the color value of the determined pixel; and
   amending the color value of the determined pixel based at least in part on the nearest color value determination to decrease blurring of the image.

24. The scanner of claim 23, further capable of determining whether a pixel is in a portion of a gray scale in an image.

25. The scanner of claim 23, further capable of amending the determined pixel of the border without introducing a substantially aliasing effect.

26. The scanner of claim 23, further capable of reducing a width of the border.

27. The scanner of claim 23, further capable of varying a brightness characteristic on the border.

28. The scanner of claim 23, further capable of:
   determining if the determined pixel is in a blurred bright area of the image or if the determined pixel is in a blurred dark area of the image;
   amending the color value of the determined pixel to increase brightness if in the blurred bright area of the image; and
   amending the color value of the determined pixel to increase darkness if in a blurred dark area of the image.

29. A digital camera capable of:
   determining whether a pixel is in a border of an object in an image;
   comparing the color value of the determined pixel to color values of two or more selected pixels;
   determining a nearest color value of the two or more selected pixels to the-color value of the determined pixel; and
   amending the color value of the determined pixel based at least in part on the nearest color value to increase the modulation transfer function of the image.

30. The digital camera of claim 29, further capable of determining whether a pixel is in a portion of a gray scale in an image.

31. The digital camera of claim 29, further capable of amending the determined pixel of the border without introducing a substantially aliasing effect.

32. The digital camera of claim 29, further capable of reducing a width of the border.

33. The digital camera of claim 29, further capable of varying a brightness characteristics on the border.

34. The digital camera of claim 29, further capable of:
   determining if the determined pixel is in a blurred bright area of the image or if the determined pixel is in a blurred dark area of the image;
   amending the color value of the determined pixel to increase brightness if in the blurred bright area of the image; and
   amending the color value of the determined pixel to increase darkness if in a blurred dark area of the image.

35. A device comprising:
   means for determining whether a pixel is in a border of an object in an image;
   means for determining a nearest color value of two or more selected pixels to a color value of the determined pixel; and
   means for amending the color value of the determined pixel based at least in part on the nearer color value to decrease blurring of the image.

36. The device of claim 35, further comprising means for determining whether a pixel is in a portion of a gray scale in an image.

37. The device of claim 35, further comprising means for amending the determined pixel of the border without introducing a substantially aliasing effect.

38. The device of claim 35, further comprising means for reducing a width of the border.

39. The device of claim 35, further comprising means for varying a brightness characteristic on the border.

40. The device of claim 35, further comprising:
means for determining if the determined pixel is in a blurred bright area of the image or if the determined pixel is in a blurred dark area of the image;
means for amending the color value of the determined pixel to increase brightness if in the blurred bright area of the image; and
means for amending the color value of the determined pixel to increase darkness if in a blurred dark area of the image.

41. The device of claim 35, wherein the device is one of a scanner or a digital camera.

\* \* \* \* \*

UNITED STATES PATENT AND TRADEMARK OFFICE
CERTIFICATE OF CORRECTION

PATENT NO. : 7,336,845 B2
APPLICATION NO. : 10/419116
DATED : February 26, 2008
INVENTOR(S) : Wang It is certified that error appears in the above-identified patent and that said Letters Patent is hereby corrected as shown below:

At column 6, line 24, please replace "comprises" with --comprise--.
At column 6, line 39, please replace "comprises;" with --comprises:--.
At column 6, line 44-45, please replace "comprises;" with --comprises:--.
At column 6, line 56, please replace "comprises;" with --comprises:--.
At column 6, line 58, please replace "[X(+1,j)-X)i,j)][X(i,j)-X(i-1,j)]>0" with --[X(i+1,j)-X(i,j)][X(i,j)-X(i-1,j)]>0--.
At column 6, line 60, please replace "[X(i,j+1(-X(i,j)][X(i,j)-X(i,j-1)]>0" with --[X(i,j+1)-X(i,j)][X(i,j)-X(i,j-1)]>0--.
At column 6, line 65, please replace "comprises;" with --comprises:--.
At column 7, line 5, please replace "and β" with --said β--.
At column 7, line 12, please replace "characteristics" with --characteristic--.
At column 7, line 36, please replace "comprises;" with --comprises:--.
At column 7, line 48, please replace "comprise;" with --comprise:--.
At column 7, line 49, please replace "[X(i+1,j)-X(i,j)][X(i-1,j)]>0" with --[X(i+1,j)-X(i,j)][X(i,j)-X(i-1,j)]>0--.
At column 7, line 51, please replace "[X(i,j+1)-X(i,j)][X)i,j)-X(i,j-1)]>0" with --[X(i,j+1)-X(i,j)][X(i,j)-X(i,j-1)]>0--.
At column 7, line 58, please replace "a×X(ij)+p×X(i,k)+y×X(mj)" with --$\alpha \times X(i,j) + \beta \times X(i,k) + \gamma \times X(m,j)$--.
At column 7, line 61, please replace "the sum" with --and the sum--.
At column 8, line 2, please replace "more other selected" with --more selected--.
At column 8, line 31, please replace "the-color" with --the color--.
At column 8, line 2, please replace "characteristics" with --characteristic--.

Signed and Sealed this

Thirteenth Day of July, 2010

David J. Kappos
*Director of the United States Patent and Trademark Office*